No. 825,863. PATENTED JULY 10, 1906.
L. OLIVER.
WATER METER.
APPLICATION FILED APR. 10, 1906.
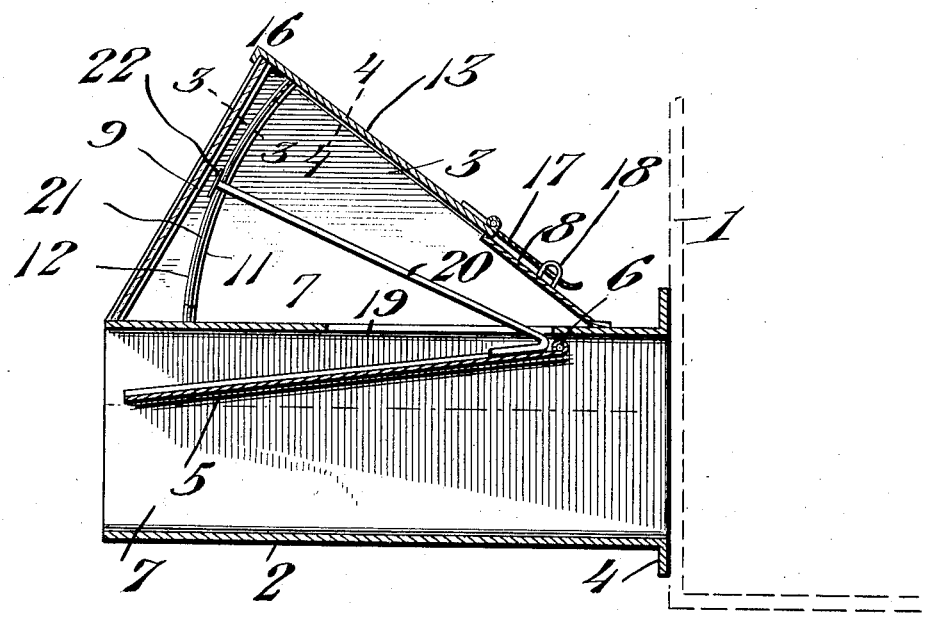
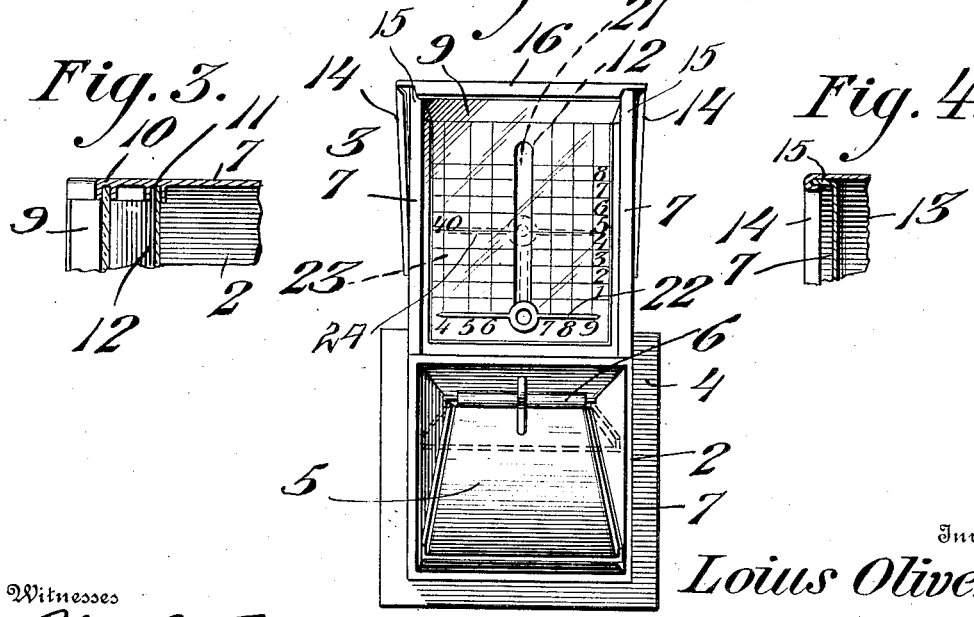
Witnesses
Phil. E. Barnes
C. C. Hiner
Inventor
Loius Oliver.
By Victor J. Evans
Attorney

UNITED STATES PATENT OFFICE.

LOUIS OLIVER, OF TWIN FALLS, IDAHO.

WATER-METER.

No. 825,863.    Specification of Letters Patent.    Patented July 10, 1906.

Application filed April 10, 1906. Serial No. 311,000.

*To all whom it may concern:*

Be it known that I, LOUIS OLIVER, a citizen of the United States of America, residing at Twin Falls, in the county of Cassia and State of Idaho, have invented new and useful Improvements in Water-Meters, of which the following is a specification.

My invention relates to a meter for measuring the amount of water flowing from a source of supply to a storage-point or point of consumption, and especially designed for indicating the amount of water passing from the canal to the ditches or laterals of an irrigating system.

In systems of this character each lateral communicates with the main canal through the medium of an outlet-box whose bottom is level with the bottom of the canal and which is provided with a sliding gate or door to cut off and control the flow of water to the ditch or lateral. No means, so far as I am aware, have been devised or provided for measuring the amount of water supplied to the ditch during the period the gate is open, and as a consequence disputes frequently arise between the farmer whose land is supplied and the water-master, the former claiming that he is not getting the amount of water to which he is entitled, while the latter as strongly insists that the farmer is getting the full supply for which he has contracted and perhaps more.

The object of my invention is to provide a device for overcoming this objection and whereby the amount of water flowing from the canal to the ditch within any given period of time may be accurately determined and disputes prevented and whereby the flow may be determined according to any degree of pressure in the canal.

In the accompanying drawings, Figure 1 is a vertical longitudinal section of a meter embodying my invention as applied in use to an outlet-box, the latter appearing in dotted lines. Fig. 2 is a front elevation of the meter. Figs. 3 and 4 are detail sections on the lines 3 3 and 4 4 of Fig. 1.

Referring to the drawings, the numeral 1 designates the outlet-box, (shown in dotted lines,) the gate being omitted; and 2 designates the meter.

As shown, the meter comprises a casing composed of a conductor 2 and a superposed housing 3, the conductor being of a regulated width and depth and provided at its inlet end with a flange 4 for attaching it to the discharge end of the outlet-box. The conductor is preferably of oblong rectangular form, and arranged therein is an automatic gate 5, said gate being pivoted at its upper rear end, as indicated at 6, so as to swing in a vertical plane, and being adapted to normally drop by gravity to the inclined position shown in Fig. 2 to close the outlet-passage.

The housing 3 is formed of side walls 7 and a short rear top wall-section 8, suitably secured to the top wall of the conductor 2. The outer or front edges of the walls 7 are arranged at an angle to give a downward and forward slope to the front wall, which is composed of a transparent panel 9, said panel being fitted in guide-grooves 10 and removable through the open top of the housing. Arranged upon the walls 7 in rear of the panel are arc-shaped guide-grooves 11, in which is slidably inserted a gage card or plate 12, which is also insertible and removable through the open top of the housing.

A sliding door or cover 13 closes the opening in the top, said door being provided at its side edges with flanged guides 14, engaging guide-flanges 15 on the walls 7 and having at the front end a stop-flange 16 to limit its rearward movement. A hasp 17 is provided on the rear edge of the door to engage a staple 18 on the wall 8, with which an ordinary padlock may be engaged to lock the door in closed position. Any other suitable type of locking means may, however, be used to prevent unauthorized persons from gaining access to the casing. Upon opening the door the glass panel and gage-card may be conveniently removed and new ones substituted therefor when occasion demands.

Attached at its rear end to the gate 5 and extending upwardly and forwardly into the casing through a slot 19 in the top of the conductor is an arm 20, which projects at its forward end through a central vertical slot 21, formed in the gage-card 12 and carries an index hand or pointer 22, extending across the gage-card, the arm 20 being movable in the slot as the gate 5 rises and falls.

The card is provided upon its face with vertical and transverse index-lines 23 and 24, forming a gage, having at its bottom a transverse row of numerals, as shown, "4," "5," "6," "7," "8," and "9," arranged in register with the lines 23 and designating water-pressure in inches, while at the right of the gage is a vertical row of numerals ranging in the present instance, from "1" to "8," inclusive, extend ing upwardly in regular order in proper juxtaposition to the lines 24. This vertical row of numerals is designed, in connection with the pointer, to indicate the depth in inches of the current of water flowing at any time through the conductor. Other numerals are designed to be arranged at the points of intersection of the lines 23 and 24 to indicate the total amount in inches of water at any of the given pressures passing through the conductor, with the current at any indicated depth. In the present instance I have shown only the numeral "40" arranged at the point of intersection of the vertical line 23 above the pressure-numeral "4" with the horizontal line 24 registering with the depth-numeral "5," which will be sufficient to illustrate the principle of operation of the invention. Of course the numerals denoting the flow according to any depth and pressure of current will be calculated in conformity with the area of the conductor 2.

In practice the device is fastened on the outer side of the outlet-box 1, and the automatic gate 5 is normally maintained by gravity in a lowered position. On opening the gate of the outlet-box, the water will flow through the conductor 2 into the ditch or lateral and will raise the gate 5, thus operating the pointer, which will indicate the depth, in inches, of the current. The pressure in the canal being known and the depth of the current passing through the conductor indicated, the amount of water flowing into the ditch within any nominal degree of time may be determined by glancing at the numeral at the point of crossing of the indicated horizontal depth-line and the vertical line, representing the known pressure. Hence the amount of time the gate must be kept open to supply the ditch with a desired amount of water or the amount of water supplied to the ditch within any given period may be readily calculated, thus avoiding all possible disputes.

The meter may be made to operate with any degree of pressure and any depth of current and provides a simple and inexpensive device for the purposes.

It will be observed that the gage-card and pointer can be readily viewed through the panel 9.

Having thus fully described the invention, what I claim as new is—

1. A water-meter comprising a casing having a flow-passage, a chamber above the flow-passage provided with a transparent panel, a closure for said chamber, a gage behind said panel, a pointer coöperating with said gage, and an automatic gate for operating the pointer.

2. A water-meter comprising a casing having a flow-passage, a chamber above the flow-passage provided with a transparent panel, a closure for said chamber, a gage behind said panel, a pointer coöperating with the gage, an automatic gate in the flow-passage, and a rod extending from the gate into said chamber and carrying the pointer.

In testimony whereof I affix my signature in presence of two witnesses.

LOUIS OLIVER.

Witnesses:
CHAS. RORABACK,
W. E. BEUS.